(12) United States Patent
Hayles, Jr. et al.

(10) Patent No.: US 8,378,922 B1
(45) Date of Patent: Feb. 19, 2013

(54) SYSTEM AND METHOD FOR POSITION OR RANGE ESTIMATION, TRACKING AND SELECTIVE INTERROGATION AND COMMUNICATION

(75) Inventors: Ralph E. Hayles, Jr., San Antonio, TX (US); James A. Moryl, San Antonio, TX (US)

(73) Assignees: Location & Tracking Technologies, LLC, New Vernon, NJ (US); Southwest Research Institute, San Antonio, TX (US)

( * ) Notice: Subject to any disclaimer, the term of this patent is extended or adjusted under 35 U.S.C. 154(b) by 26 days.

(21) Appl. No.: 12/537,161

(22) Filed: Aug. 6, 2009

Related U.S. Application Data

(62) Division of application No. 11/339,192, filed on Jan. 25, 2006, now Pat. No. 7,580,004.

(60) Provisional application No. 60/646,549, filed on Jan. 25, 2005.

(51) Int. Cl.
*H01Q 15/08* (2006.01)
*H01Q 19/06* (2006.01)
*G01S 5/02* (2010.01)

(52) U.S. Cl. .................... 343/911 L; 342/417

(58) Field of Classification Search ............. 343/753, 343/754, 755, 911 L; 342/45, 417, 432, 445
See application file for complete search history.

(56) References Cited

U.S. PATENT DOCUMENTS

| | | | | |
|---|---|---|---|---|
| 5,821,908 | A * | 10/1998 | Sreenivas | 343/911 R |
| 6,295,455 | B1 * | 9/2001 | Fischer et al. | 455/456.2 |
| 6,424,319 | B2 * | 7/2002 | Ebling et al. | 343/911 L |
| 6,437,727 | B2 * | 8/2002 | Lemelson et al. | 342/45 |
| 6,545,632 | B1 * | 4/2003 | Lyons et al. | 342/45 |

* cited by examiner

Primary Examiner — Robert Karacsony

(57) ABSTRACT

A method of estimating an arc-position of a distal transmitter is disclosed. In one embodiment, the method includes: (1) receiving radio frequency signals from said distal transmitter into an antenna having an array of feed horns and a Luneberg lens portion and (2) estimating an arc-position of said distal transmitter based on signal strengths provided by ones of said feed horns.

16 Claims, 4 Drawing Sheets

SYSTEM AND METHOD FOR POSITION OR RANGE ESTIMATION, TRACKING AND SELECTIVE INTERROGATION AND COMMUNICATION

CROSS-REFERENCE TO RELATED APPLICATION

This application is a divisional of U.S. application Ser. No. 11/339,192, entitled "SYSTEM AND METHOD FOR POSITION OR RANGE ESTIMATION TRACKING AND SELECTIVE INTERROGATION AND COMMUNICATION," filed on Jan. 25, 2006 now U.S. Pat. No. 7,580,004, by Ralph E. Hayles, Jr., et al., which claims the benefit of U.S. Provisional Application Ser. No. 60/646,549, filed by Moryl, et al., on Jan. 25, 2005, entitled "Interrogation and Position Locating System," wherein both are commonly assigned with the present invention and incorporated herein by reference. The present application is also related to U.S. patent Ser. No. 10/972,958, filed by Hayles, et al., on Oct. 25, 2004, entitled "System and Method for Highly Directional Electronic Identification and Communication and Combat Identification System Employing the Same," commonly assigned with the present invention and incorporated herein by reference.

TECHNICAL FIELD OF THE INVENTION

The present invention is directed, in general, to wireless identification and communication systems and, more specifically, to a system and method for position or range estimation, tracking and selective interrogation and communication.

BACKGROUND OF THE INVENTION

Secure and reliable wireless communication is important in the context of combat. Such communication may involve one or more of identification, estimating position or range, tracking movement and voice, video or data communication. Split-second firing decisions are based on target identification. Knowing that a potential target is a friendly unit and not an enemy is critically important in order to avoid fratricide (so-called "friendly fire incidents"). The problem is compounded when aircraft are involved in a battle. Aircraft are fast-moving and carry substantial destructive power that is often deployed based upon almost instinctive firing decisions. A firing decision made with inadequate knowledge of target or collateral damage potential may prove disastrously incorrect.

The only communication systems practical for battlefield use are wireless. Wireless identification and communication systems are a vital technology in today's world. Most such systems are omnidirectional; they broadcast signals fairly uniformly in all directions. Omnidirectional communication systems are desirable in many applications, because they need not be steered to maintain communication. They can serve broader territories, too.

Some applications benefit from directional communication systems. Compared to omnidirectional communication systems, directional communication systems transmit signals predominantly to, or receive signals predominantly from, a relatively narrow span of directions. Directional communication systems have some distinct advantages. First, since they focus the power they transmit onto a relatively narrow span of directions, they require less power than omnidirectional systems or alternatively are able to transmit farther than omnidirectional systems using the same power. Second, signal interception by an unauthorized third party is less likely, since the third party must be aligned with the transmitting antenna in order to receive the signal.

Full communication between elements of a force is important. However, conventional battlefield communication systems are bulky and thus difficult to transport. Mobility is a key attribute of a modern fighting force. Therefore, a more transportable communication system would be highly advantageous.

Accordingly, what is needed in the art is a system capable of one or more of position or range estimation, tracking and selective interrogation and communication. What is further needed is a system that can afford protection to dismounted troops and wheeled vehicles. What is also needed in the art are methods of effecting such position or range estimation, tracking and selective interrogation and communication to and from multiple transceivers. What is still further needed in the art is a weapons platform incorporating such system or methods.

SUMMARY OF THE INVENTION

For purposes of the present invention, "communication" is defined as passing information from one communication terminal to another. "Identification" is defined as ascertaining the position, direction or arc-position, range or identity of a terminal. Communication may or may not involve identification. Identification does involve communication, although perhaps to a limited extent. "Position" and "location" are synonymous for purposes of the present invention.

In one aspect, the disclosure provides a method of estimating an arc-position of a distal transceiver. In one embodiment, the method includes: (1) receiving RF signals from the distal transceiver into an antenna having an array of feed horns and a Luneberg lens portion and (2) estimating an arc-position of the distal transceiver based on signal strengths provided by ones of the feed horns.

The foregoing has outlined preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
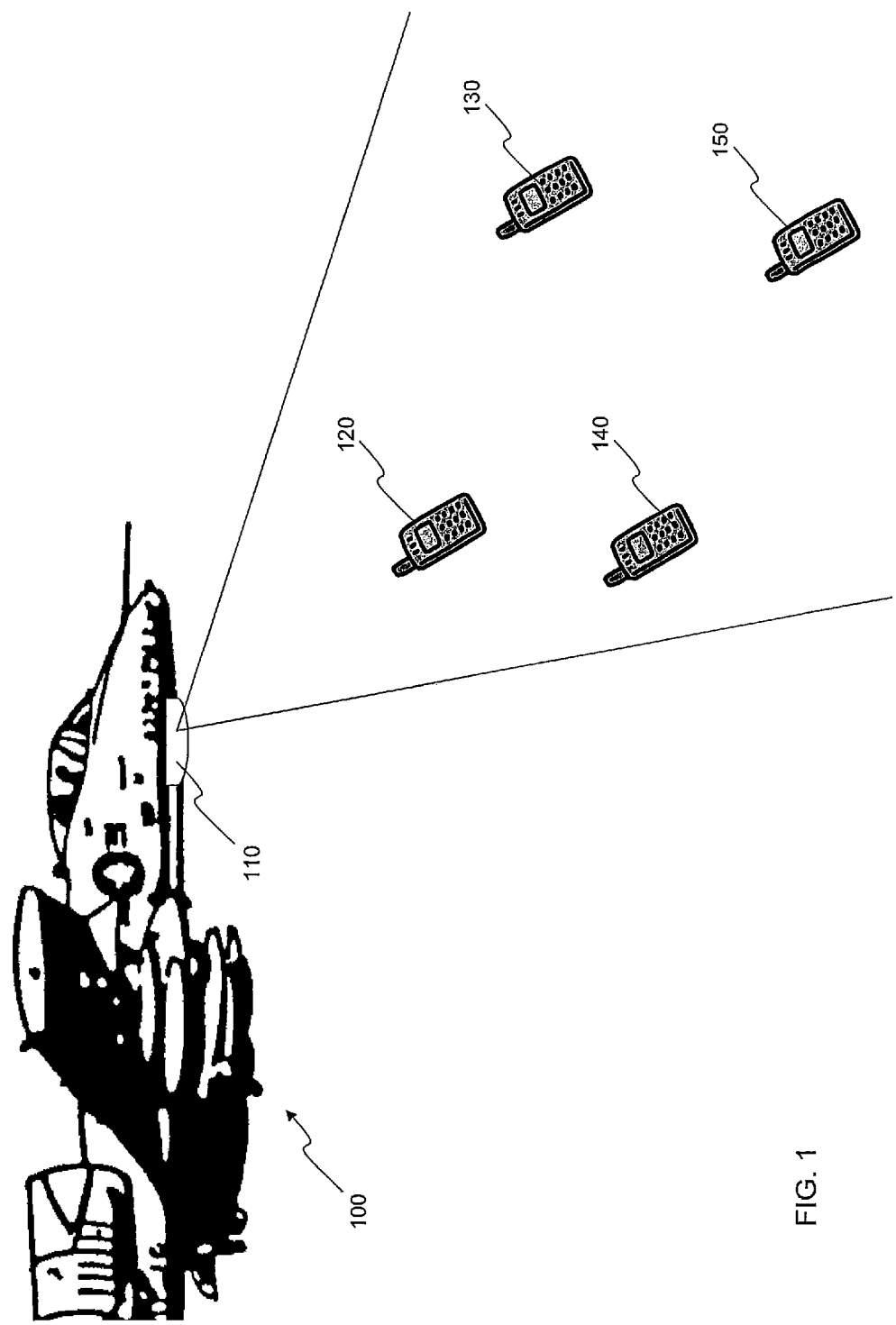
FIG. 1 illustrates a schematic view of one embodiment of an antenna mountable on a weapons platform and constructed according to the principles of the present invention.

Referring initially to FIG. 1, illustrated is a schematic view of one embodiment of an antenna constructed according to the principles of the present invention. In FIG. 1, the antenna is illustrated as being mounted on a vehicle, and specifically a weapons platform 100. The weapons platform 100 is illustrated generally as being a fixed-wing aircraft, and more specifically an attack aircraft configured to serve in a battlefield interdiction role, and even more specifically an A-10 Thunderbolt II, which is well-regarded for its ability to loiter over a battlefield and destroy enemy targets such as tanks, personnel carriers and radar sites as needed. Those skilled in the art should recognize, however, that the present invention is not limited to a weapons platform and, in fact, encompasses any vehicle or fixed or moveable structure whatsoever.

As described above, many modern weapons platforms are capable of wreaking great destruction on any target they may designate. Given this fact, it is important that the targets they choose be appropriately enemy targets, and not those of friendly forces. Firing decisions are often made rapidly, and always based on the information at hand. Therefore, a system that places more accurate and timely information about a potential target in the hands of the person having to make a firing decision would be of considerable benefit.

Therefore, one aspect of the present invention introduces an antenna that can be mounted on a weapons platform, e.g., 100. With respect to the specific weapons platform 100 of FIG. 1, the antenna is located in a protective shell 110 (taking the form of a radome or blister) that is slung under the weapons platform 100, for example along its centerline. This position is advantageous in that the antenna has a direct view of the underlying battlefield. However, those skilled in the pertinent art will understand that the antenna may be mounted at any suitable place on, in or about the weapons platform 100.

The antenna is configured to transmit RF signals within, or receive radio frequencies transmitted within, a defined cone, designated by solid lines emanating from the protective shell 110. FIG. 1 shows four transceivers 120, 130, 140, 150 (which, in the illustrated embodiment, are omnidirectional) that are located within the defined cone and therefore able to receive RF signals from, or transmit RF signals to, the antenna, or both. Advantageously, each of the transceivers 120, 130, 140, 150 is located proximate an element of a friendly force (e.g., a soldier or vehicle). In the illustrated embodiment, the transceivers 120, 130, 140, 150 assume the general shape, size and weight of a common cellphone, although this certainly need not be the case. As will be seen, the antenna is further capable of transmitting or receiving RF signals even more selectively. The ability of the antenna to communicate selectively with the plurality of transceivers 120, 130, 140, 150 is valuable in certain applications, which will be highlighted in the discussion that follows. Those skilled in the art should understand that the antenna can communicate with other antennas of the same or similar type, perhaps mounted on other weapons platforms, vehicles of other types or at fixed locations.

Figure 2:
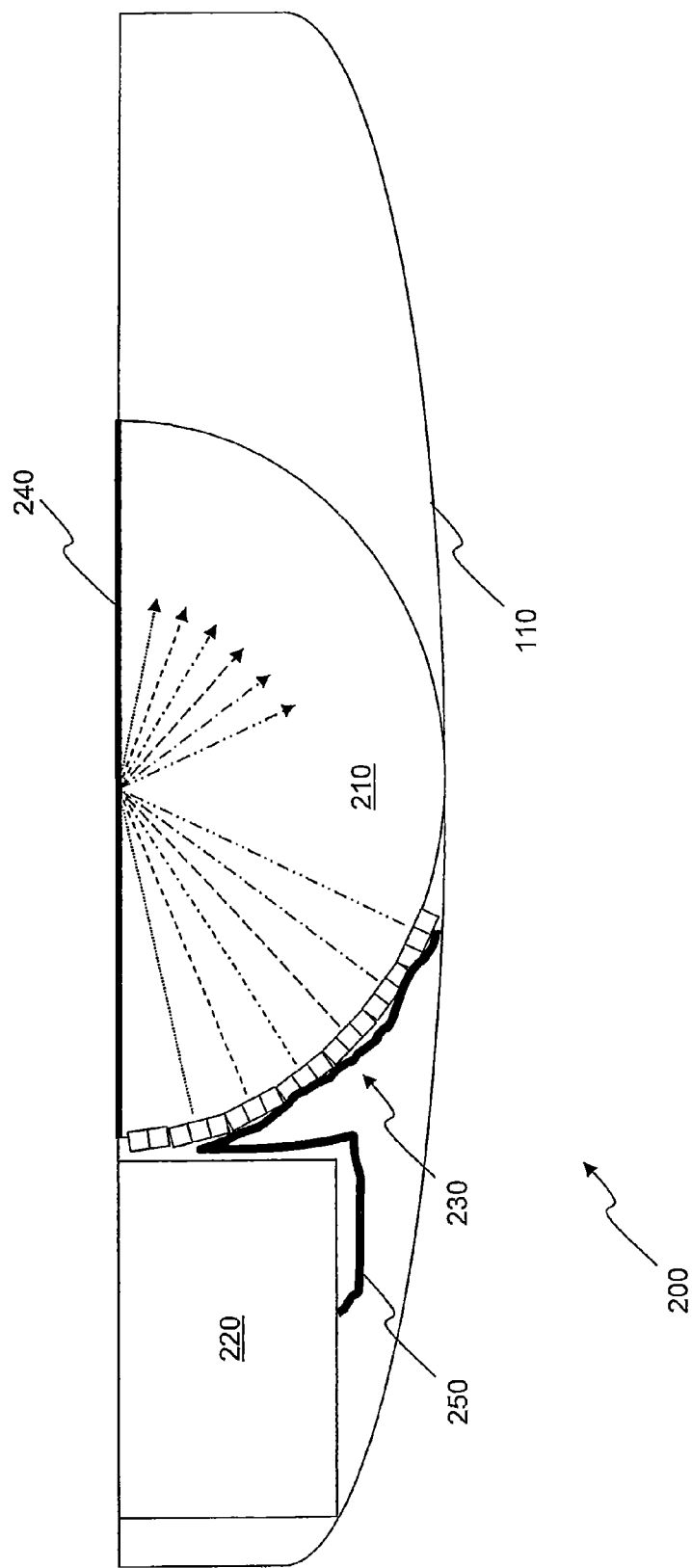
FIG. 2 illustrates a schematic sectional view of one embodiment of the antenna of FIG. 1.

The structure and function of the antenna will be set forth in substantially greater detail in conjunction with FIG. 2. Accordingly, turning now to FIG. 2, illustrated is a schematic sectional view of one embodiment of the antenna of FIG. 1.

The antenna, now generally designated 200, includes a Luneberg lens portion 210. The Luneberg lens portion 210 takes, in the specific embodiment of FIG. 2, the form of a hemisphere and accordingly has a substantially planar surface and a convex surface. As oriented in FIG. 2, the substantially planar surface constitutes a horizontal upper surface of the Luneberg lens portion, and the convex surface constitutes the remaining surface of the Luneberg lens portion 210. In the embodiment of FIG. 2, the Luneberg lens portion 210 is fully contained within the protective shell 110 to protect it from foreign object damage and the slipstream surrounding the weapons system 100 of FIG. 1 during flight. In one embodiment, the Luneberg lens portion 210 has a diameter between about four inches and about sixteen inches, although the present invention is not constrained to a particular diameter of Luneberg lens portion 210 and does not require that the Luneberg lens portion be hemispherical.

Those skilled in the pertinent art understand that a Luneberg lens is a generally spherical structure composed of layers of materials having different dielectric constants. A Luneberg lens functions to cause diverging RF signals to collimate or to cause collimated RF signals to converge. For a general discussion of Luneberg lenses, see, e.g., http://stewks.ece.stevens-tech.edu/luneberg.dir/Report2.apr99/luneberg-apr99.pdf.

A base station 220 is also located within the protective shell 110, although this need not be the case. The base station 220 is configured to contain circuitry that supports the operation of the antenna 200. Such circuitry may include modulation/demodulation circuitry (to generate an RF signal for transmission and/or extract data from a received RF signal), encryption/decryption circuitry (to provide privacy for communications), feed horn selection circuitry (for example to select subsets of one or more of the feed horns for transmission or reception), map correlation circuitry (for example to correlate feed horns with particular geographic areas), display drive circuitry (for example to display position or range estimates or both, tracking information or other data to an operator of the weapons platform 100) or any other appropriate circuitry. The base station 120 may be analog or digital, capable of transmitting or receiving on any operating frequency or band of frequencies suitable to a Luneberg lens and capable of transmitting at any suitable power level. Those skilled in the pertinent art will understand that a wide array of base station topologies is within the broad scope of the present invention.

The base station 220 is illustrated as being coupled to an array of feed horns 230 located proximate the convex surface of the Luneberg lens portion 210. A transmission line 250 couples the base station 220 to each of the array of feed horns 230. In one embodiment, the feed horns in the array of feed horns 230 produce RF signals having a carrier frequency of between about 4 GHz and about 30 GHz. The RF signals bear digital data or, alternatively, may bear analog waveforms. An exemplary arrangement of the array of feed horns 230 will be set forth below.

An RF reflective layer 240 is located proximate the substantially planar surface of the Luneberg lens portion 210. The RF reflective layer 240 is configured to reflect RF energy directed toward the substantially planar surface back to within the Luneberg lens portion 210 as shown in FIG. 2. By way of example, FIG. 2 associates broken lines of differing design with some of the array of feed horns 230. The broken lines terminate in arrowheads, representing transmissions from the various feed horns. However, the broken lines can just as well represent receptions. It is apparent that the broken lines adhere to the well-known half-angle theorem of optics that applies to reflected beams of energy. Accordingly, the RF reflective layer 240 allows the Luneberg lens portion 210 to act as a full-sphere Luneberg lens.

An exemplary arrangement of the array of feed horns 230 will now be set forth. The array of feed horns 230 may be a one-dimensional array positioned along the convex surface of the Luneberg lens portion 210. It may be advantageous to arrange the one-dimensional array in a straight line, although this need not be the case.

The array of feed horns 230 of FIG. 2, however, is a two-dimensional array positioned about the convex surface of the Luneberg lens portion 210. In one embodiment, the two-dimensional array is orthogonal, such that the array of feed horns 230 is arranged into columns and rows on the convex surface. From an examination of FIG. 2, those skilled in the pertinent art will readily see that an orthogonal two-dimensional array of feed horns corresponds to a two-dimensional grid of particular geographic areas on the land or sea lying below the weapons platform 100 of FIG. 1. Although distortion (brought about by keystoning and uneven terrain) often causes the grid of particular geographic areas to be somewhat nonorthogonal, the correspondence remains by virtue of arc-position (the horizontal and/or vertical position on an arc). RF signals received by a particular feed horn can be assumed to be emanating from a transmitter (e.g., part of a transceiver) located in a corresponding particular geographic area, and RF signals transmitted by a particular feed horn will be projected toward the corresponding particular geographic area.

Figure 3B:
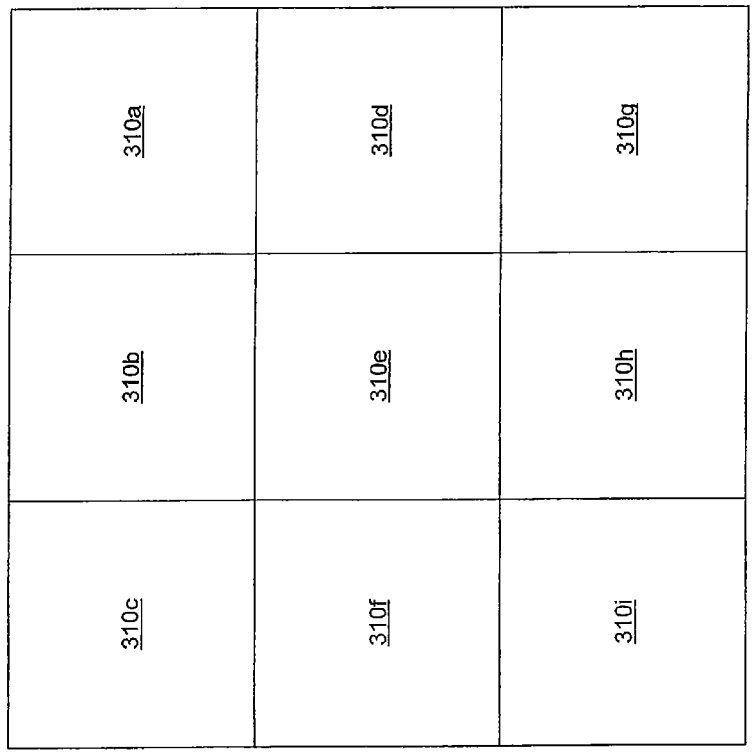
FIGS. 3 and 3B together illustrate a more detailed view of one embodiment of a two-dimensional array of feed horns and a corresponding terrestrial grid of particular geographic areas containing potential transceiver positions.
Figure 3A:
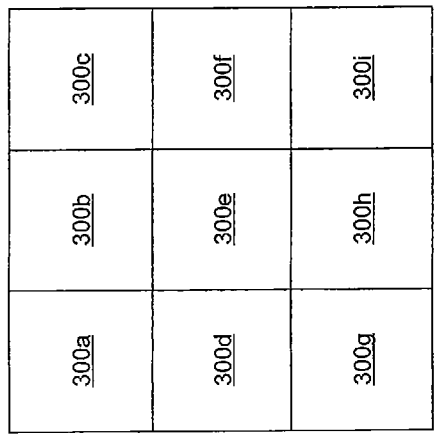

FIGS. 3A and 3B illustrates an exemplary "mapping" between a two-dimensional array of feed horns (FIG. 3A) and (neglecting distortion) a corresponding, idealized grid of particular geographic areas (FIG. 3B). FIG. 3A illustrates a 3×3 two-dimensional array of feed horns consisting of feed horns 300a-300i. FIG. 3B illustrates a corresponding 3×3 grid consisting of geographic areas 310a-310i. By way of example, the feed horn 300b produces RF signals that strike and reflect off of the RF reflective layer 240 of FIG. 2 at a relatively shallow angle, corresponding to the geographic area 310b. Likewise, the feed horn 300h produces RF signals that strike and reflect off of the RF reflective layer 240 of FIG. 2 at a relatively steep angle, corresponding to the geographic area 310h. Since the feed horn 300a lies to the left of centerline, the RF signals it produces project to the right of centerline and thus correspond to the geographic area 310a. Likewise, since the feed horn 300i lies to the right of centerline, the RF signals it produces project to the left of centerline and thus correspond to the geographic area 310i. The array of feed horns 300a-300i therefore correspond in mirror-image to the grid of geographic areas 310a-310i.

Potential applications of the antenna now become readily apparent. If transceivers are located in particular areas within the grid of particular geographic areas, their RF transmissions are received by particular feed horns in the array of feed horns. Their estimated positions may therefore be plotted on a map or other orientation method based on the signals received by the array of feed horns. Changes in their positions or ranges over time may be monitored allowing the transceivers to be tracked, perhaps over multiple geographic areas. As the weapons platform moves, the positions and ranges of the areas and the transceivers move. Therefore, this movement can be compensated for or taken into account in making position estimates or tracking.

Certain embodiments of the antenna are capable of transmitting RF signals as well as receiving them. Accordingly, bidirectional communication may be established between the antenna and one or more of the transceivers or other directional antennas of a type described herein. In one embodiment, each feed horn in the array of feed horns is configured to produce RF signals concurrently. This allows signals to be broadcast to the entire grid. In an alternative embodiment, the feed horns are configured to produce RF signals selectively. This allows one or more geographic areas or selected transceivers or selected antennas to be designated to receive a transmission. This also allows the entire grid or some portion thereof to be scanned. Directing transmissions to limited areas decreases the possibility of interception by enemy forces.

The antenna may be used as an interrogation component of a combat identification system in which friendly forces are equipped with omnidirectional transponder or transceiver units designed to function at or near the frequency employed by the interrogation unit. The transponders of any friendly forces receiving the interrogation signal would respond with a signal identifying themselves as friendly forces, which would almost certainly factor into a firing decision.

Figure 4:
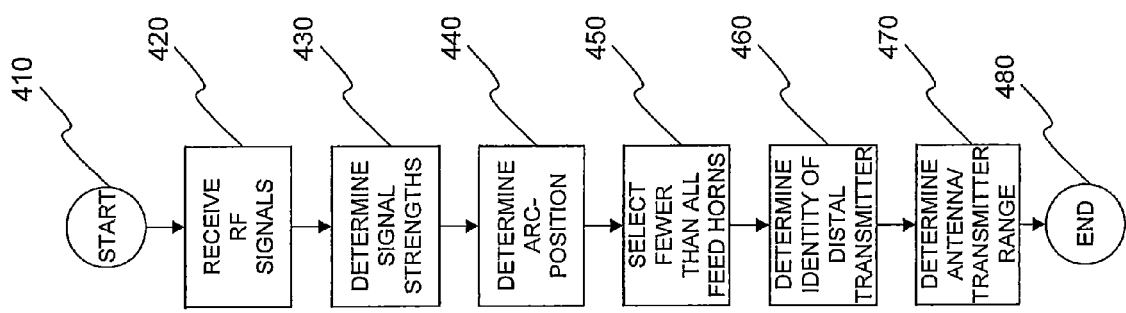
FIG. 4 illustrates a flow diagram of one embodiment of a method of estimating position or range carried out according to the principles of the present invention.

Turning now to FIG. 4, illustrates a flow diagram of one embodiment of a method of estimating an arc-position of a distal transmitter carried out according to the principles of the present invention. The method starts in a start step 410.

In a step 420, RF signals are received from the distal transmitter into an antenna having an array of feed horns and a Luneberg lens portion. The RF signals may have been generated in response to an interrogation signal generated by the antenna or another source. In a step 430, signal strengths provided by one or more of the feed horns are determined. In a step 440, the arc-position of the distal transmitter is estimated based on the signal strengths provided by ones of the feed horns. For example, turning back to FIGS. 3A and 3B, if a transceiver is located in the geographic area 310d, the signal strength of an RF signal received from the transceiver would be expected to register the highest from the feed horn 300d. The feed horns 300a, 300e and 300g may register lower signal strengths than that of the feed horn 300d. The remaining feed horns 300b, 300c, 300f, 300h, 300i would be expected to register the lowest signal strength. Accordingly, the transceiver can be reasonably estimated to lie within the geographic area 310d. Of course, the 3×3 array of FIG. 3A is relatively small and therefore capable of providing only gross position information. A larger array of smaller feed horns covering the same area of a Luneberg lens portion would facilitate a determination of a more precise transmitter location.

In an optional step 450, fewer than all feed horns in the array of feed horns are selected, based on the estimated arc-position, to transmit an RF signal to the transmitter directionally. Thus, any transmissions generated by the antenna may be directed to the area surrounding the transmitter rather than being broadcast. Alternatively, all of the feed horns may be made to transmit in concert, effecting a wide-area broadcast of the transmission.

In an optional step 460, the specific identity of the distal transmitter may be determined based on data carried in signals received therefrom. Transmissions to and from the distal transmitter may be used to ascertain its identity. To this end, the distal transmitter may have a unique identifying code associated therewith.

In an optional step 470, the range between the antenna and the transceiver may be determined based on a time delay between a transmission of an interrogation signal from the antenna and a receipt of a response signal from the distal transmitter. This range may be used to confirm, or improve the accuracy of, the position estimate. The method ends in an end step 480.

Although having described particular embodiments of the present invention in a military context, those skilled in the art should understand that the present invention has substantial potential for civilian or mixed use. For example, one or more antennas of a type described herein may be mounted at fixed locations at an airport, and transceivers associated with vehicles, e.g., aircraft, that traverse the airport. In such applications, the antenna(s) can enable a system to warn vehicles of impending collision or departure from a desired course of travel. Sports venues may likewise use such antennas to map the location of transceivers to enable a tracking system for, e.g., security purposes. Those skilled in the pertinent art will perceive a wide array of attractive and advantageous uses for the embodiments of the antenna, system and method described herein.

Although the present invention has been described in detail, those skilled in the pertinent art should understand that they can make various changes, substitutions and alterations herein without departing from the spirit and scope of the invention in its broadest form.

What is claimed is:

1. A method of estimating an arc-position of a distal transmitter, comprising:
   receiving radio frequency signals from said distal transmitter into an antenna having an array of radio frequency signal conveyors and a Luneberg lens portion, wherein each radio frequency signal conveyor of said radio frequency signal conveyor array corresponds to a specific location of a grid of a geographic area associated with said antenna; and
   estimating an arc-position of said distal transmitter within said grid based on signal strengths provided by ones of said radio frequency signal conveyors, wherein a strength of radio frequency signals received by particular radio frequency signal conveyors of said radio frequency signal conveyor array are employed for said estimating said arc-position of said distal transmitter in said grid.

2. The method as recited in claim 1 further comprising selecting, based on said estimated arc-position, fewer than all radio frequency signal conveyors in said array of radio frequency signal conveyors to transmit a radio frequency signal to said transmitter directionally.

3. The method as recited in claim 1 further comprising determining a specific identity of said distal transmitter based on data carried in signals received therefrom.

4. The method as recited in claim 1 further comprising determining a range between said antenna and said transceiver based on a time delay between a transmission of an interrogation signal from said antenna and a receipt of a response signal from said distal transmitter.

5. The method as recited in claim 1 wherein said radio frequency signals bear digital data.

6. The method as recited in claim 1 wherein said radio frequency signals bear an analog waveform.

7. The method as recited in claim 2 further comprising encrypting data in said radio frequency signal.

8. The method as recited in claim 1 wherein said distal transmitter has a unique identifying code associated therewith.

9. The method as recited in claim 2 wherein said array of radio frequency signal conveyors is a one-dimensional array positioned along a convex surface of said Luneberg lens portion.

10. The method as recited in claim 2 wherein said array of radio frequency signal conveyors is a two-dimensional array positioned about a convex surface of said Luneberg lens portion.

11. The method as recited in claim 2 wherein said array of radio frequency signal conveyors forms a grid on a convex surface of said Luneberg lens portion.

12. The method as recited in claim 2 wherein said array of radio frequency signal conveyors produces radio frequency signals having a carrier frequency of between about 4 GHz and about 30 GHz.

13. The method as recited in claim 1 wherein arc-positions maintain correspondence between transmitters in said grid of said geographic area and said radio frequency signal conveyor array when said grid is nonorthogonal.

14. The method as recited in claim 1 wherein said radio frequency signal conveyors are feed horns.

15. A method of estimating a position of a distal transmitter in a two-dimensional grid of a geographic area associated with said antenna, comprising:
   receiving radio frequency signals from said distal transmitter into an antenna having a two-dimensional array of radio frequency signal conveyors and a Luneberg lens portion, wherein each radio frequency signal conveyor of said radio frequency signal conveyor array corresponds to a specific location of said grid; and
   estimating a position of said distal transmitter in said grid based on signal strengths provided by particular ones of said two-dimensional array of radio frequency signal conveyors, wherein a strength of radio frequency signals received by particular radio frequency signal conveyors of said radio frequency signal conveyor array indicate said position of said transceiver in said grid and correspondence between said grid and said radio frequency signal conveyor array is maintained by arc-positioning.

16. The method as recited in claim 15 wherein said radio frequency signal conveyors are feed horns.

\* \* \* \* \*